(12) United States Patent
Hong et al.

(10) Patent No.: US 12,488,823 B2
(45) Date of Patent: Dec. 2, 2025

(54) MEMORY DEVICE AND OPERATION METHOD THEREOF

(71) Applicant: SAMSUNG ELECTRONICS CO., LTD., Suwon-si (KR)

(72) Inventors: Seungki Hong, Suwon-si (KR); Seung-jun Lee, Suwon-si (KR); Minho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 18/119,458

(22) Filed: Mar. 9, 2023

(65) Prior Publication Data

US 2024/0112716 A1    Apr. 4, 2024

(30) Foreign Application Priority Data

Sep. 29, 2022 (KR) .................. 10-2022-0124199

(51) Int. Cl.
*G11C 11/40* (2006.01)
*G11C 11/406* (2006.01)
*G11C 11/408* (2006.01)

(52) U.S. Cl.
CPC ........ *G11C 11/406* (2013.01); *G11C 11/4085* (2013.01); *G11C 11/4087* (2013.01)

(58) Field of Classification Search
CPC .............. G11C 11/406; G11C 11/4085; G11C 11/4087; G11C 11/40618
See application file for complete search history.

(56) References Cited

U.S. PATENT DOCUMENTS

| 5,898,638 | A | 4/1999 | Keeth |
| 6,587,391 | B2 | 7/2003 | Jung et al. |
| 6,765,842 | B2 | 7/2004 | Kim |
| 7,319,631 | B2 | 1/2008 | Cho |
| 7,881,146 | B2 | 2/2011 | Baek et al. |
| 8,553,466 | B2 | 10/2013 | Han et al. |
| 2002/0026556 | A1* | 2/2002 | Ji ..................... G11C 11/406 365/233.1 |
| 2002/0196669 | A1* | 12/2002 | Hsu ................. G11C 11/406 365/189.04 |
| 2004/0165472 | A1* | 8/2004 | Yamazaki ......... G11C 7/1021 365/233.1 |
| 2009/0249169 | A1* | 10/2009 | Bains ................ G06F 11/106 714/766 |
| 2022/0148647 | A1* | 5/2022 | Johnson ........... G11C 11/4076 |

FOREIGN PATENT DOCUMENTS

KR    11-16348 A    1/1999

* cited by examiner

*Primary Examiner* — Xiaochun L Chen
(74) *Attorney, Agent, or Firm* — Sughrue Mion, PLLC

(57) ABSTRACT

A memory device includes plural banks that perform a per-bank refresh (PBR) operation, and an address register that provides a single row address signal to two banks of the plural banks, the two banks simultaneously performing the PBR operation and the single row address signal being shared by the two banks. The two banks activate a word line of each memory cell array based on a single decoded row address signal that is generated based on the single row address signal.

15 Claims, 8 Drawing Sheets

MEMORY DEVICE AND OPERATION METHOD THEREOF

CROSS-REFERENCE TO RELATED APPLICATION

This application claims is based on and claims priority to Korean Patent Application No. 10-2022-0124199 filed in the Korean Intellectual Property Office on Sep. 29, 2022, the entire contents of which are incorporated by reference herein.

BACKGROUND

The present disclosure relates to a memory device and an operation method thereof.

A memory device such as a dynamic random access memory (DRAM) may include a memory cell array for storing data. Generally, since arrangement of the memory cell array is implemented as a lattice divided into rows and columns, it is possible to access cells to read or write data by designating addresses including rows and columns. The DRAM may include a plurality of memory cell arrays, and a group including at least some of the plurality of memory cell arrays may be defined as a bank.

Each of memory cells configuring the memory cell array may include a cell transistor serving as a switch and a capacitor for storing data. In order to prevent data stored in the cell capacitor from being erased, a refresh operation for recharging the data in the memory cell is required. The refresh operation may include an auto refresh operation, which performs a refresh operation according to a refresh command applied from the outside, and a self-refresh operation, which performs a refresh operation while sequentially changing internal addresses by itself according to a refresh command applied from the outside. The refresh operation may be divided into an all bank refresh operation that refreshes all banks, and a single bank refresh operation or a per-bank refresh (PBR) operation that refreshes each bank.

SUMMARY

It is an aspect to provide a memory device that may reduce a size and power consumption thereof by merging a decoded row address driver, and an operation method thereof.

According to an aspect of one or more embodiments, there is provided a memory device comprising a plurality of banks that perform a per-bank refresh (PBR) operation; and an address register that provides a single row address signal to two banks of the plurality of banks, the two banks simultaneously performing the PBR operation and the single row address signal being shared by the two banks, wherein the two banks activate a word line of each memory cell array based on a single decoded row address signal that is generated based on the single row address signal.

According to another aspect of one or more embodiments, there is provided a memory device comprising two banks including a row decoder area and an interface area that are shared by the two banks; and an address register providing a single row address signal to the two banks, wherein the row decoder area includes a decoded row address driver that generates a word line enable signal based on a single decoded row address signal generated based on the single row address signal, and wherein a first memory cell array included in a first bank of the two banks is accessed based on the word line enable signal in a first time interval, and a second memory cell array included in a second bank of the two banks is accessed based on the word line enable signal in a second time interval subsequent to the first time interval.

According to yet another aspect of one or more embodiments, there is provided an operation method of a memory device, the operation method comprising activating a single decoded row address signal according to a first activation command for a first bank; generating a first word line enable signal based on the single decoded row address signal, a first block access signal, and a first activation signal; activating the single decoded row address signal according to a second activation command for a second bank simultaneously performing a per-bank refresh (PBR) operation with the first bank; and generating a second word line enable signal based on the single decoded row address signal, a second block access signal, and a second activation signal.

BRIEF DESCRIPTION OF THE DRAWINGS

The above and other aspects will be more clearly understood from the following detailed description, taken in combination with the accompanying drawings, in which.

DETAILED DESCRIPTION

Figure 1:
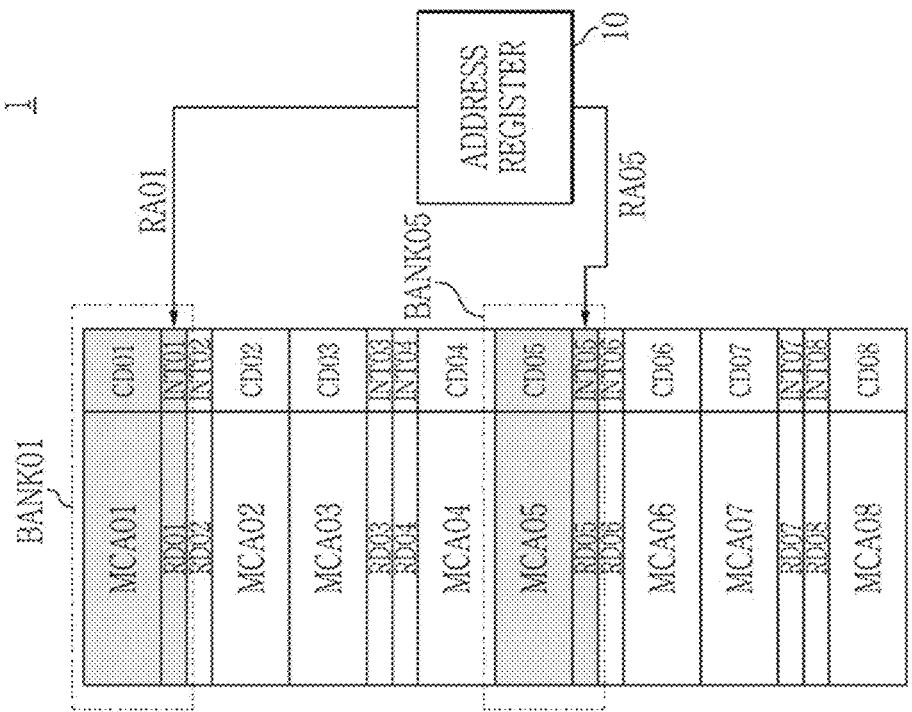
FIG. 1 illustrates a memory device according to some embodiments.

Various embodiments will be described more fully hereinafter with reference to the accompanying drawings, in which various embodiments are shown. As those skilled in the art will realize, the described embodiments may be modified in various different ways, all without departing from the spirit or scope of the appended claims. Accordingly, the drawings and description are to be regarded as illustrative in nature and not restrictive. Like reference numerals designate like elements throughout the specification.

In this specification, a singular form may include a plural form as well, unless the explicit expression such as "one" or "single" is used. Terms including ordinal numbers such as first, second, and the like describe various constituent elements, and are not to be interpreted as limiting these constituent elements. The terms first, second, and the like are used to distinguish one constituent element from another constituent elements. Thus, a "first" element may be referred to as a "second" element, and a "second" element may be referred to as a "first" element.

FIG. 1 illustrates a memory device according to some embodiments.

Referring to FIG. 1, a semiconductor device may include a plurality of banks and an address register 10. In some embodiments, the semiconductor device 1 may be a low power consumption DRAM, that is, a low-power double data rate (LPDDR). In some embodiments, the semiconductor device 1 may be an LPDDR5, and may include 16 banks. However, the embodiments are not limited to a semiconductor device with 16 banks and the LPDDR5, and may be applied to any memory device in which banks may be defined on an internal structure thereof.

As illustrated in FIG. 1, a bank BANK01 may include a memory cell array MCA01, a column decoder area CD01, a row decoder area RD01, and an interface area INT01.

The memory cell array MCA01 includes a plurality of memory cells, and each of the memory cells may include a cell transistor and a capacitor. The memory cell array MCA01 included in one bank BANK01 may include a plurality of rectangular arrays each configured of memory cells. A memory controller may access the memory cell array MCA01 by using an address including a row and a column for each of the plurality of rectangular arrays to read or write data.

The plurality of memory cells of the memory cell array MCA01 may form a two-dimensional structure in which a word line corresponding to a control line and a bit line corresponding to a data line are shared. The row decoder area RD01 may include a row decoder for specifying a word line, and the column decoder area CD01 may include a column decoder for selecting a bit line and transmitting the selected data to an input/output pad (I/O pad). In this configuration, a bit line sensing amplifier for sensing a value of cell data that is connected to a bit line CBL having a relatively large capacitance value to have a small change in a relative value due to charge sharing may exist.

The interface area INT01 may receive a row address (RA) to generate a decoded row address (DRA) signal. In some embodiments, the interface area INT01 may generate the decoded row address signal by using bank information (BRA). The generated decoded row address signal may be provided to the row decoder area RD01.

The row decoder area RD01 may include a decoded row address driver (DRA driver) that receives a decoded row address signal and generates a word line enable signal. The decoded row address driver may latch a word line enable signal PNWEIB based on an activation signal PNWR and a block access signal PDPXIP. In some embodiments, the activation signal PNWR may be a global master signal that selects a desired block in the row decoder area RD01, and the block access signal PDPXIP may be a signal for determining enable/disable of a block selected according to the decoded row address signal. The row decoder area RD01 may further include a circuit including a word line driver that provides a word line driving signal WL to the row decoder according to the word line enable signal PNWEIB.

A bank BANK05 may include a memory cell array MCA05, a column decoder area CD05, a row decoder area RD05, and an interface area INT05. The memory cell array MCA05, the column decoder area CD05, the row decoder area RD05, and the interface area INT05 may have a similar configuration and function as the above-described descriptions of the memory cell array MCA01, the column decoder area CD01, the row decoder area RD01, and the interface area INT01, respectively, and thus redundant descriptions thereof will be omitted for conciseness.

In some embodiments, the bank BANK0 and the bank BANK5 may be configured to simultaneously perform a per-bank refresh (PBR) operation. In some embodiments, the simultaneously performing of the PBR operation may mean that the PBR operations of the banks BANK0 and BANK5 are performed within a predefined time. In some embodiments, the predefined time may be determined as an appropriate time according to a specific implementation purpose and implementation environment. In some embodiments, the simultaneously performing of the PBR operation may include simultaneous occurrence of toggles of signals related to the refresh operation. As such, a bank in which the PBR operation is simultaneously performed may be referred to as a PBR pair bank.

For example, when receiving a memory access request from a host device including a processor, the memory controller may store the corresponding requests in a request queue and then generate a series of DRAM commands. When there is no request from the bank, the bit line is precharged and the cell data is not sensed by the bit line sense amplifier. When an activation command (ACT) is inputted, the row decoder of the corresponding bank specifies a word line and senses cell data. The sensed row data is stored in a row buffer, and cell data may be read or written according to the read command (RD) or the write command (WR). When the row address to be accessed is different, that is, when a row buffer miss occurs, the bank precharge may be performed and the corresponding word line may be reactivated. A delay time taken at this time may be defined as a cycle time.

In some embodiments, the address register 10 may provide a first row address signal RA01 and a second row address signal RA05 to the interface areas INT01 and INT05 of the banks BANK01 and BANK05, respectively. Based on a first decoded row address signal DRA01 generated in the interface area INT01, a decoded row address driver of the bank BANK01 may generate a first word line enable signal to implement access to the memory cell array MCA01, and based on a second decoded row address signal DRA02 generated in the interface area INT05, a decoded row address driver of the bank BANK05 may generate a second word line enable signal to implement access to the memory cell array MCA05.

Figure 2:
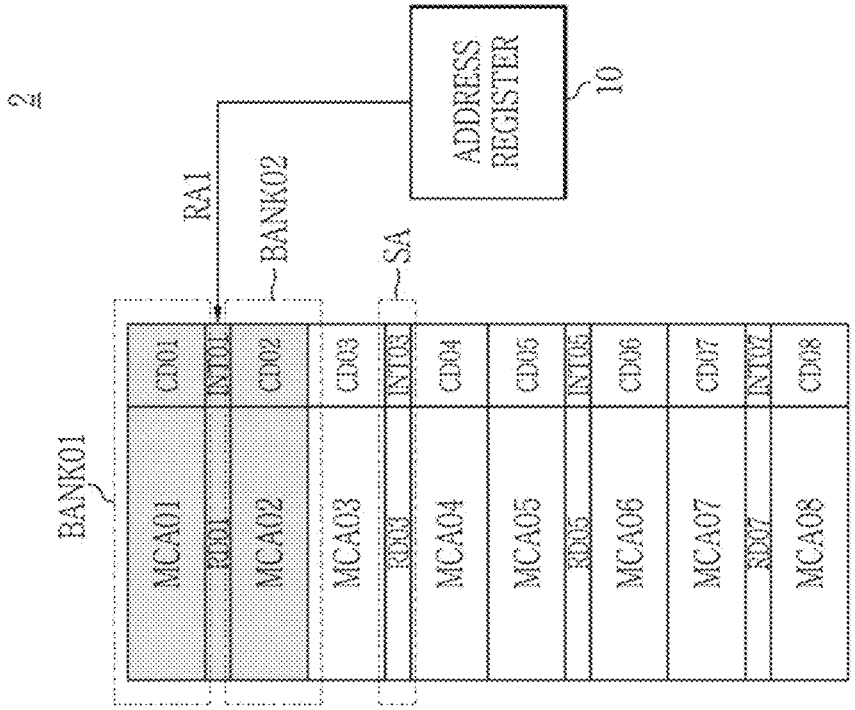
FIG. 2 illustrates a memory device according to some embodiments.

FIG. 2 illustrates a memory device according to some embodiments.

Referring to FIG. 2, a memory device 2 is different from the memory device 1 of FIG. 1 in that it further includes a shared area SA between a plurality of banks disposed to be adjacent to each other. The memory device 2 is different form the memory device 1 of FIG. 1 in that a plurality of banks may perform a PBR operation, and two banks simultaneously performing a PBR operation are arranged to be adjacent to each other. That is, the shared area SA may be defined between two adjacent banks (for example, between the banks BANK01 and BANK02) that simultaneously perform a PBR operation among a plurality of banks.

In some embodiments, the bank BANK01 may include the memory cell array MCA01 and the column decoder area CD01, the bank BANK02 may include the memory cell array MCA02 and the column decoder area CD02, and the shared area SA defined between the banks BANK01 and BANK02 may include the row decoder area RD01 and the interface area INT01. In some embodiments, the row decoder area RD01 and the interface area INT01 may be shared by the bank BANK01 and the bank BANK02.

In some embodiments, the address register 10 may provide a single row address signal RA1 shared by the bank BANK01 and the bank BANK02 to the banks BANK01 and BANK02. Accordingly, the decoded row address driver of the bank BANK01 may generate a first word line enable signal based on a single decoded row address signal DRA01 generated in the interface area INT01 to implement access to the memory cell array MCA01, and a decoded row address driver of the bank BANK02 may generate a second word line enable signal based on the single decoded row address signal DRA01 to implement access to the memory cell array MCA02. That is, the banks BANK01 and BANK02 may respectively activate the word lines of the memory cell arrays MCA01 and MCA02 based on the single decoded row address signal DRA01.

In some embodiments, since the bank BANK01 and the bank BANK02 have the column decoder area CD01 and the column decoder area CD02, respectively, the column decoder areas may not be shared by the bank BANK01 and the bank BANK02.

According to some embodiments, compared to the embodiment of FIG. 1, by activating the word line by using the structure in which the decoded row address is merged between the two banks, an area of the decoded row address latch formed in the interface area may be reduced by half, and an area of the interface area for generating the decoded row address signal may also be reduced by half. In addition, the decoded row address lines in the row decoder may also be merged to reduce the number of the decoded row address lines by half, and in performing the refresh operation, the current caused by the decoded row address toggle may be reduced by half.

As described above, a method of controlling the timing of the decoded row address driver and the word line driver to arrange the PBR pair banks adjacent to each other and to implement control of the shared area SA therebetween will be described later with reference to FIG. 5. Hereinafter, the decoded row address driver may also be indicated as a DRA driver.

Figure 3:
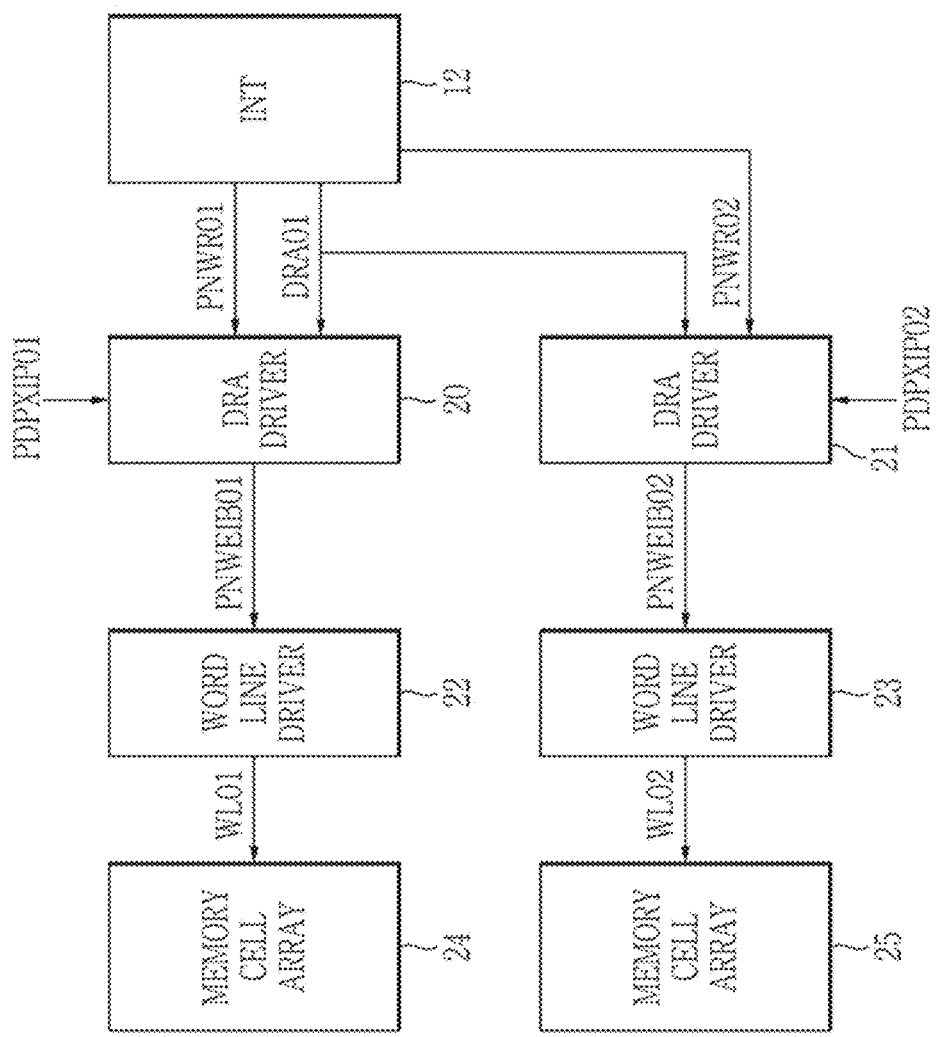
FIG. 3 illustrates a memory device according to some embodiments.

FIG. 3 illustrates a memory device according to some embodiments.

Referring to FIG. 3, a memory device may include an interface area INT 12, a plurality of DRA drivers 20 and 21, a plurality of word line drivers 22 and 23, and a plurality of memory cell arrays 24 and 25. In some embodiments, the interface area INT 12, the plurality of DRA drivers 20 and 21, and the plurality of word line drivers 22 and 23 may be circuits formed in the shared area SA described above with reference to FIG. 2.

The DRA driver 20 may generate a word line enable signal PNWEIB01 based on the single decoded row address signal DRA01 and the activation signal PNWR01 that are provided from the interface area 12, and a block access signal PDPXIP01 that is enabled according to coding of the decoded row address and is disabled according to the precharge signal. According to an implementation manner, in some embodiments, the block access signal may further include a signal PDPXIPD01.

The word line driver 22 may generate a word line driving signal WL01 based on the word line enable signal PNWEIB01, and the word line driving signal WL01 may be transmitted to the row decoder to be used to specify a word line in the memory cell array 24.

In some embodiments, the DRA driver 20 may generate a first word line boosting signal PXIB01 and a second word line boosting signal PXID01 based on the single decoded row address signal DRA01, similar to generating the word line enable signal PNWEIB01. In this case, the word line driver 22 may generate one word line driving signal WL01 according to coding of the word line enable signal PNWEIB01, the first word line boosting signal PXIB01, and the second word line boosting signal PXID01.

The DRA driver 21 may generate a word line enable signal PNWEIB02 based on the single decoded row address signal DRA01 and the activation signal PNWR02 that are provided from the interface area 12, and a block access signal PDPXIP02 that is enabled according to coding of the decoded row address and is disabled according to the precharge signal. According to an implementation manner, in some embodiments, the block access signal may further include a signal PDPXIPD02.

The word line driver 23 may generate a word line driving signal WL02 based on the word line enable signal PNWEIB02, and the word line driving signal WL02 may be transmitted to the row decoder to be used to specify a word line in the memory cell array 25.

In some embodiments, the DRA driver 21 may generate a third word line boosting signal PXIB02 and a fourth word line boosting signal PXID02 based on the single decoded row address signal DRA01, similar to generating the word line enable signal PNWEIB02. In this case, the word line driver 23 may generate one word line driving signal WL02 according to coding of the word line enable signal PNWEIB02, the third word line boosting signal PXIB02, and the fourth word line boosting signal PXID02.

That is, access to the memory cell array 24 and the memory cell array 25 may be performed based on the single decoded row address signal DRA01.

In some embodiments, the DRA driver 20 may generate the word line enable signal PNWEIB01 and may generate a word line enable signal PNWEIB02 in a second time interval following a first time interval. Accordingly, an access to the memory cell array 24 and an access to the memory cell array 25 may be sequentially performed based on the single decoded row address signal DRA01, and the order may be determined, for example, according to the generation order of the activation command ACT.

That is, the memory cell array 24 included in one of the two banks (e.g., a first bank of the two banks) corresponding to the PBR pair bank may be accessed based on the word line enable signal PNWEIB01 in the first time interval, and the memory cell array 25 included in the other one of the two banks (i.e., in a second bank of the two banks) may be accessed based on the word line enable signal PNWEIB02 in the second time interval following the first time interval.

Figure 4:
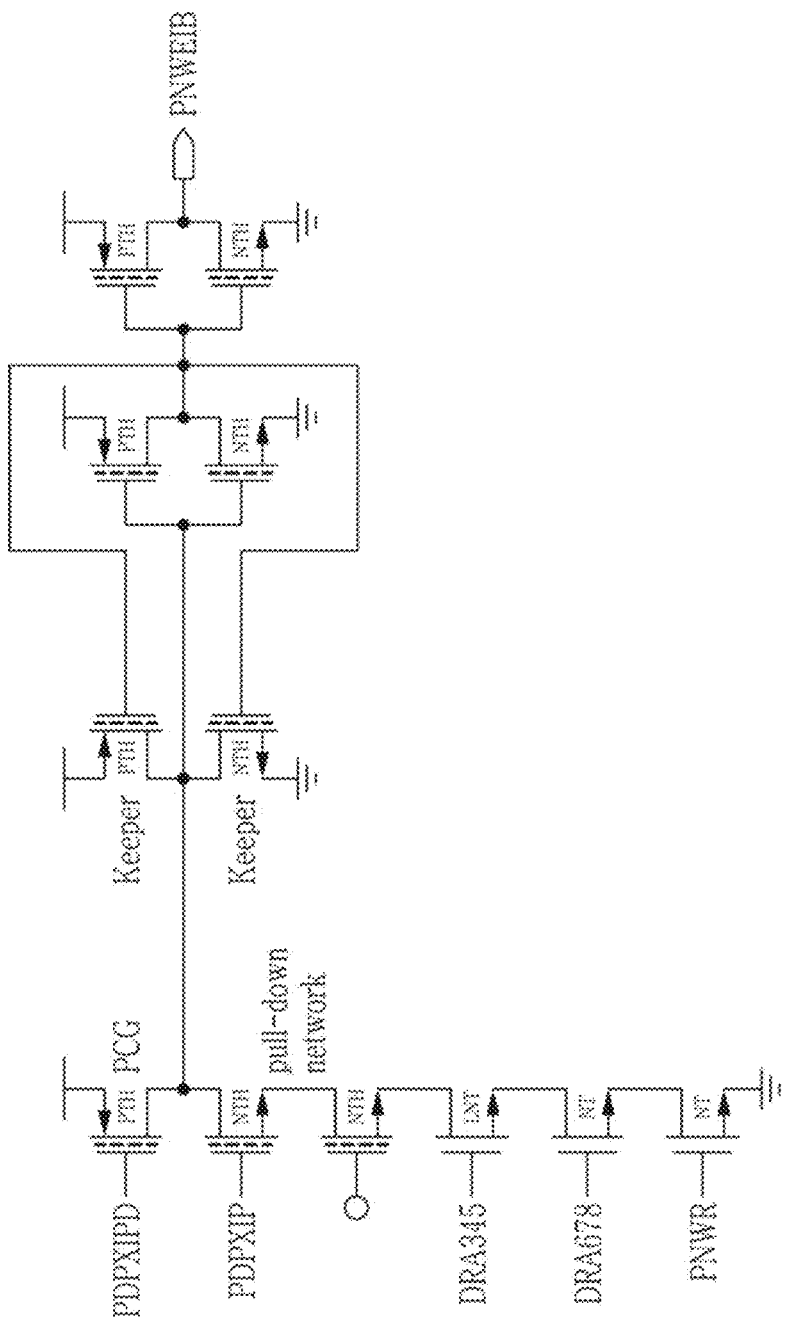
FIG. 4 illustrates a decoded row address driver according to some embodiments.

FIG. 4 illustrates a decoded row address driver according to some embodiments.

Referring to FIG. 4, a decoded row address driver may include a pull-down network including transistors that perform pull-down by receiving a block access signal PDPXIP, decoded row address signals DRA345 and DRA678, and an activation signal PNWR; a precharge transistor PCG receiving a block access signal PDPXIPD to trigger a precharge operation; and an inverting circuit that finally outputs the word line enable signal PNWEIB. Accordingly, when a signal of the pull-down network is enabled, the word line enable signal PNWEIB may be in a low enable state. When the precharge transistor PCG is turned on, the word line enable signal PNWEIB may be disabled.

In some embodiments, the decoded row address driver may further include a keeper circuit (Keeper) for latching the state of the word line enable signal PNWEIB even when the state of the signal of the pull-down network is changed.

The word line enable signal PNWEIB generated as described above with respect to FIG. 4 may be used together with the word line boosting signals PXID and PXIB in a sub-word line block SWB to be used to output a word line driving signal WL. The word line boosting signals PXID and PXIB may also be generated through a circuit similar to the circuit shown in FIG. 4.

The circuit shown in FIG. 4 is merely an example of an implementation of the decoded row address driver, and detailed implementation details may be changed according to a specific implementation purpose and implementation environment.

Figure 5:
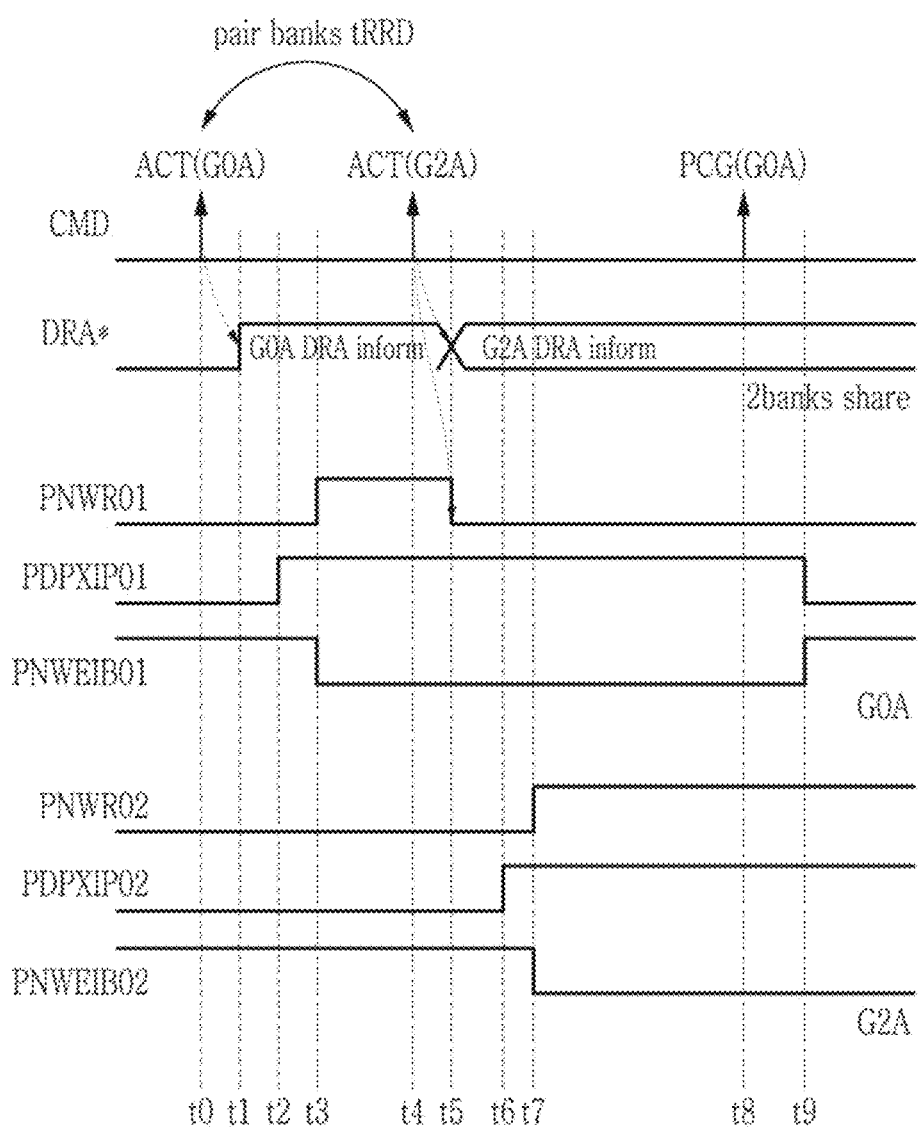
FIG. 5 illustrates an operation method of a memory device according to some embodiments.

FIG. 5 illustrates an operation method of a memory device according to some embodiments.

Referring to FIG. 5, an operation method of a memory device may include activating the single decoded row address signal DRA according to a first activation command ACT(GOA) for the first bank; generating the first word line enable signal PNWEIB01 based on the single decoded row address signal DRA, the first block access signal PDPXIP01, and the first activation signal PNWR01; activating the single decoded row address signal DRA according to a second activation command ACT(G2A) for the first bank and the second bank simultaneously performing the PBR operation; and generating the second word line enable signal PNWEIB02 based on the single decoded row address signal DRA, the second block access signal PDPXIP02, and the second activation signal PNWR02.

In some embodiments, the first activation command ACT (GOA) may be generated at a time point t0 and the single decoded row address signal DRA may be activated at a time point t1. In this case, the activated single decoded row address signal DRA may include information about the decoded row address signal for the first bank. After the single decoded row address signal DRA is activated, the first block access signal PDPXIP01 may be activated at a time point t2 (i.e., changed from low to high). The first block access signal PDPXIP01 is a signal separated for each bank, and may be enabled depending on whether a block is accessed in the row decoder, or may be disabled for precharge. Thereafter, at a time point t3, the first activation signal PNWR01 may be activated (i.e., changed from low to high), and the first word line enable signal PNWEIB01 may be activated (i.e., changed from high to low). In some embodiments, depending on an implementation method, a time point at which the first activation signal PNWR01 is activated and the first word line enable signal PNWEIB01 is activated may be the time point 2.

Thereafter, after a time tRRD to secure a sufficient time for the first word line enable signal PNWEIB01 to be enabled is set, the second activation command ACT(G2A) may be generated at a time point t4, and the single decoded row address signal DRA may be activated at a time point t5. In this case, the activated single decoded row address signal DRA may include information about the decoded row address signal for the second bank.

In some embodiments, the first activation signal PNWR01 may be deactivated (i.e., changed from high to low) at the time point t5 after the second activation command ACT (G2A) is generated. In this way, it is possible to prevent the decoded row address from being abnormally sampled.

After the single decoded row address signal DRA is activated, the second block access signal PDPXIP02 may be activated (i.e., changed from low to high) at a time point t6. Thereafter, at a time point t7, the second activation signal PNWR02 may be activated (i.e., changed from low to high), and the second word line enable signal PNWEIB02 may be activated (i.e., changed from high to low). In some embodiments, depending on an implementation method, a time point at which the second activation signal PNWR02 is activated and the second word line enable signal PNWEIB02 is activated may be the time point t6.

That is, in some embodiments, the first activation signal PNWR01 may be deactivated when the second command ACT is generated. That is, the activation signal PNWR01 for one bank (e.g., a first bank) may be deactivated when the activation command ACT for another bank (e.g., a second bank) is generated. In addition, the second activation signal PNWR02 may be activated after the first activation signal PNWR01 is deactivated. That is, the activation signal PNWR02 for the another bank (e.g., the second bank) may be activated after the activation signal PNWR01 for the one bank (e.g., the first bank) is deactivated.

In some embodiments, the first bank may perform a precharge operation based on a precharge command PCG generated while the activation signal PNWR02 for the second bank is activated. Specifically, at a time point t8, the precharge command PCG may be generated while the activation signal PNWR02 for the second bank is activated, and the first bank may perform the precharge operation at a time point t9.

According to this example method, control of the shared area SA between adjacently disposed PBR pair banks may be implemented.

Figure 6:
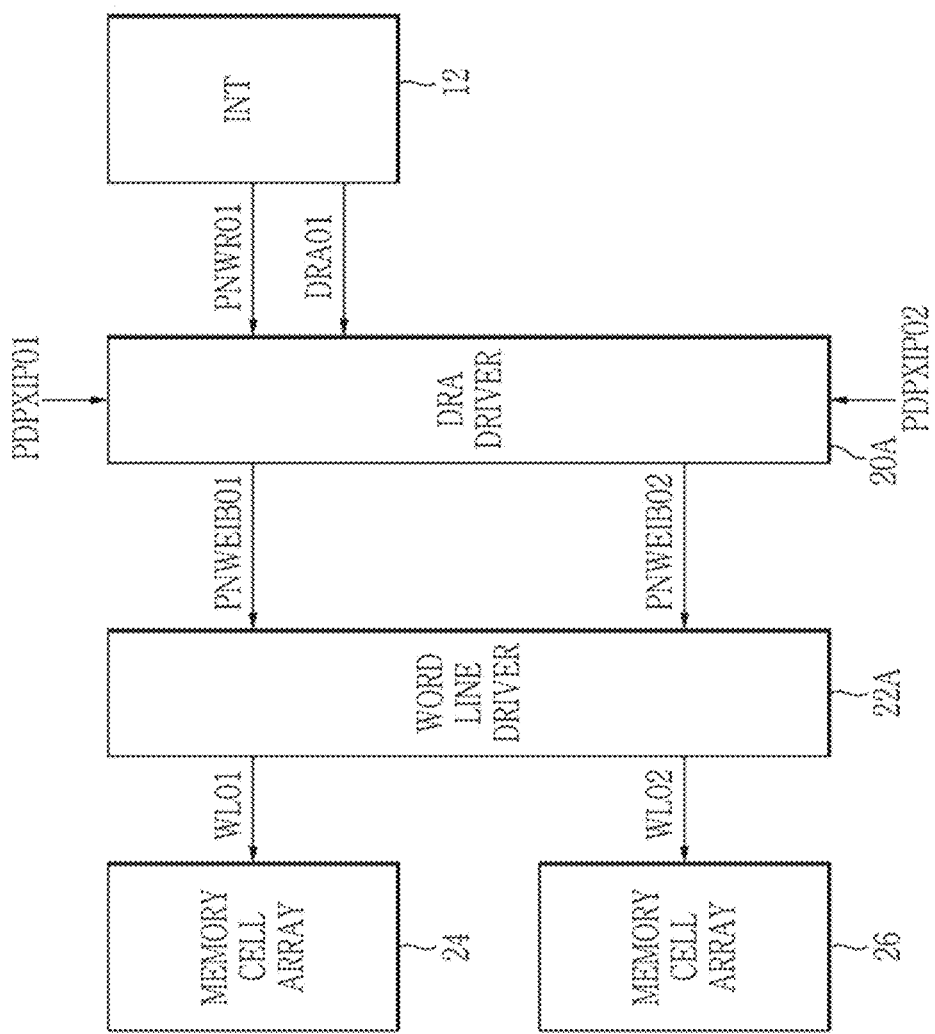
FIG. 6 illustrates a memory device according to some embodiments.

FIG. 6 illustrates a memory device according to some embodiments.

Referring to FIG. 6, a memory device may include an interface area INT 12, a single DRA driver 20A, a single word line driver 22A, and a plurality of memory cell arrays 24 and 26. In some embodiments, the DRA driver 20A and the word line driver 22 may be circuits formed in the shared area SA described above with reference to FIG. 2. A difference from the embodiment of FIG. 3 is that the DRA driver 20A and the word line driver 22A are each implemented as a single circuit, and the activation signal PNWR01 is used as a single signal with different timings. To implement some embodiments, the circuit configuration of the DRA driver described above with reference to FIG. 4 may be appropriately changed.

The DRA driver 20A may generate word line enable signals PNWEIB01 and PNWEIB02 based on the single decoded row address signal DRA01 and the single activation signal PNWR01 that are provided from the interface area 10, and block access signals PDPXIP01 and PDPXIP02 that are enabled according to coding of the decoded row address and are disabled according to the precharge signal. According to an implementation manner, in some embodiments, the block access signal may further include signals PDPXIPD01 and PDPXIPD02.

The word line driver 22A may generate the word line driving signals WL01 and WL02 based on respective word line enable signals PNWEIB01 and PNWEIB02, and the word line driving signals WL01 and WL02 may be respectively transmitted to the row decoder to be used to specify a word line in the memory cell array 24 and the memory cell array 25.

That is, access to the memory cell array 24 and the memory cell array 25 may be performed based on the single decoded row address signal DRA01 and the single activation signal PNWR01 whose timing is adjusted.

In some embodiments, the DRA driver 20a may generate word line boosting signals PXIB01, PXID01, PXIB02, and PXID02 based on the single decoded row address signal DRA01, similar to generating the word line enable signals PNWEIB01 and PNWEIB02. In this case, the word line driver 22a may generate one word line driving signal WL01 according to the coding of the word line enable signal PNWEIB01 and the word line boosting signals PXIB01 and PXID01, and may generate another word line driving signal WL02 according to the coding of the word line enable signal PNWEIB02 and the word line boosting signals PXIB02 and PXID02.

Specifically, the DRA driver 20A may generate the word line enable signal PNWEIB01 in a state in which the activation signal PNWR01 is activated, and may generate the word line enable signal PNWEIB02 in a state in which the activation signal PNWR01 is deactivated and then the activation signal PNWR01 is reactivated.

Figure 7:
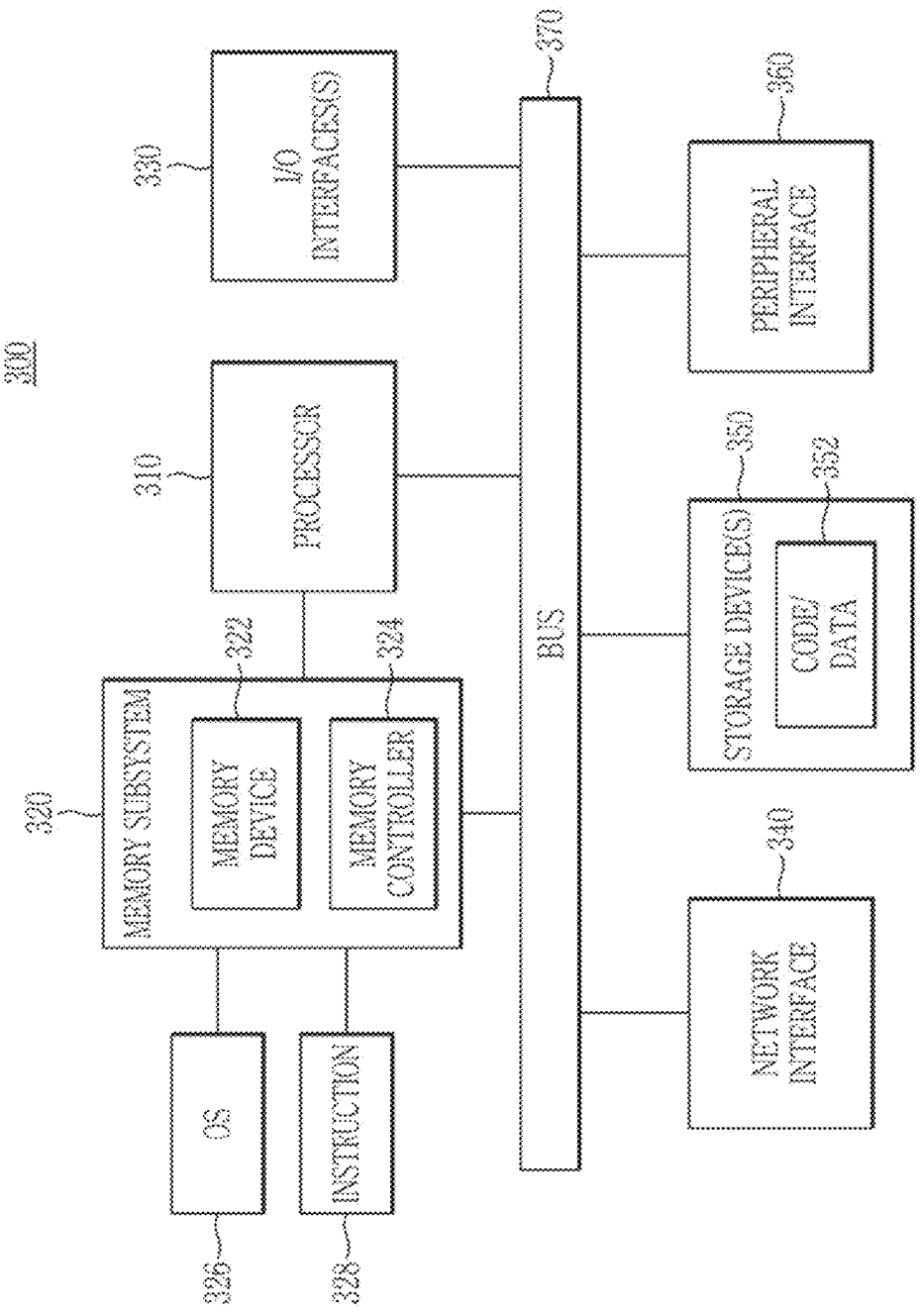
FIG. 7 illustrates a computing system according to some embodiments.

FIG. 7 illustrates a computing system according to some embodiments.

Referring to FIG. 7, a computing system 300 is a computing device including the memory device according to various embodiments described herein. The computing device may be, for example, a laptop computer, a desktop computer, a server, a game or entertainment control system, a scanner, a copier, a printer, a routing or switching device, or another electronic device. The computing system 300 includes a processor 310, which may provide processing, operation management, and execution of instructions for the computing system 300. The processor 310 may include a microprocessor, a central processing unit (CPU), a processing core, or other processing hardware that provides processing for the computing system 300. The processor 310 controls the overall operation of the computing system 300, and may be or include one or more programmable general-purpose or special-purpose microprocessors, digital signal processors (DSPs), programmable controllers, application specific integrated circuits (ASICs), programmable logic devices (PLDs), or the like, or a combination of such devices.

A memory subsystem 320 represents the main memory of the computing system 300, and may provide temporary storage for code to be executed by the processor 310, or data values to be used in executing a routine. The memory subsystem 320 may include one or more memory devices such as a read-only memory (ROM), a flash memory, one or more varieties of random access memory (RAM), or other memory devices, or a combination of such devices. The memory subsystem 320 may store and host an operating system (OS) 326 to provide a software platform for execution of instructions in the computing system 300. In some embodiments, other instructions 328 may be stored in and executed from the memory subsystem 320 to provide the logic and the processing of the computing system 300. The OS 326 and the instructions 328 may be executed by the processor 310.

The memory subsystem 320 may include a memory device 322 in which the memory device stores data, instructions, programs, or other items. In one embodiment, the memory subsystem includes a memory controller 324, and may include a scheduler that generates and issues commands for the memory device 322. In some embodiments, the memory device 322 may correspond to the memory devices described above with reference to FIG. 1 to FIG. 6.

The processor 310 and the memory subsystem 320 may be connected to a bus 370. In some embodiments, the bus 370 may be a bus system. The bus 370 may be an abstraction that represents one or more separate physical buses, communication lines/interfaces, and/or point-to-point connections, connected by appropriate bridges, adapters, and/or controllers. Therefore, the bus 370 may include, for example, one or more of a system bus, a peripheral component interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as a "firewire"). Buses of the bus 370 may also correspond to interfaces in a network interface 340.

The computing system 300 may also include one or more input/output (I/O) interface(s) 330, a network interface 340, one or more storage device(s) 350, and a peripheral interface 360 connected to the bus 370. The I/O interface(s) 330 may include one or more interface components through which a user interacts with the computing system 300 (for example, video, audio, and/or alphanumeric interfacing). The network interface 340 provides the computing system 300 the ability to communicate with remote devices (for example, servers, other computing devices) through one or more networks. The network interface 340 may include an Ethernet adapter, wireless interconnection components, universal serial bus (USB), or other wired or wireless standards-based or proprietary interfaces.

The storage device(s) 350 may be or include any medium for storing large amounts of data in a nonvolatile manner, such as one or more magnetic, solid state, or optical based disks, or a combination thereof. The storage device(s) 350 may hold code or instructions and data 352 in a persistent state. The storage device(s) 350 may be generically considered to be a "memory," while the memory subsystem 320 is an executing or operating memory to provide instructions to the processor 310. The storage device(s) 350 are nonvolatile, while the memory subsystem 320 may include a volatile memory.

The peripheral interface 360 may include a hardware interface not specifically mentioned above. Peripherals generally refer to devices that are dependently connected to the computing system 300. The dependent connection is one in which the computing system 500 provides a software and/or hardware platform in which an operation is executed and with which a user interacts.

Figure 8:
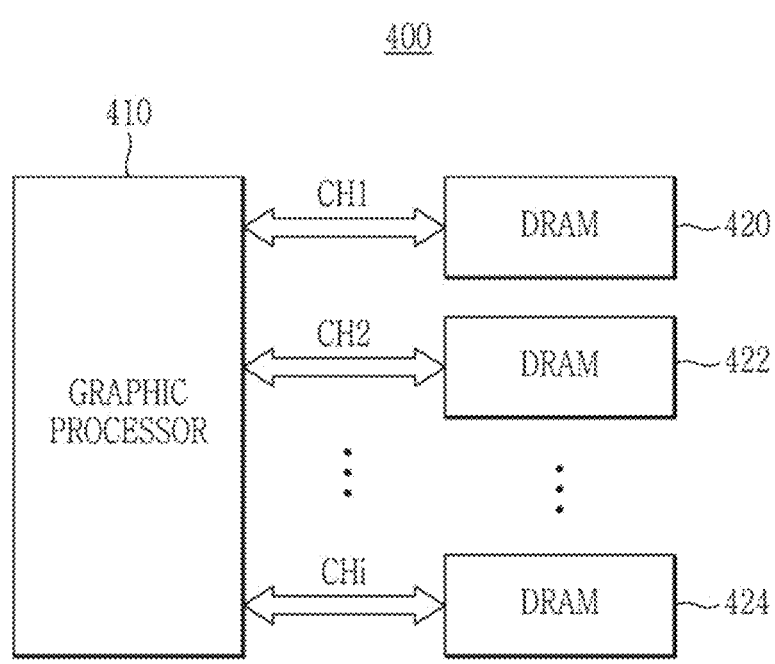
FIG. 8 illustrates a graphic system according to some embodiments.

FIG. 8 illustrates a graphic system according to some embodiments.

Referring to FIG. 8, a graphic system 400 may include a graphic processor 410 and a plurality of DRAM devices 420 to 424. The graphic processor 410 may be configured to perform various arithmetic operations for processing image information. The graphic processor 410 may be connected to the plurality of DRAM devices 420 to 424 through a plurality of channels CH1 to CHi. For example, each of the plurality of channels CH1 to CHi may be a communication channel based on a graphic double data rate (GDDR) interface. In some embodiments, each of the plurality of DRAM devices 420 to 424 may correspond to the memory devices described above with reference to FIG. 1 to FIG. 6.

While various embodiments have been described in connection with what is presently considered to be practical embodiments, it is to be understood that embodiments are not limited to the disclosed embodiments, but, on the contrary, are intended to cover various modifications and equivalent arrangements included within the spirit and scope of the appended claims.

What is claimed is:

1. A memory device comprising:
a plurality of banks that perform a per-bank refresh (PBR) operation;
a shared area disposed between two banks of the plurality of banks, the shared area including a row decoder area and an interface area that are shared by the two banks; and
an address register that provides a single row address signal to the two banks of the plurality of banks, the two banks simultaneously performing the PBR operation and the single row address signal being shared by the two banks, wherein the two banks activate a word line based on a single decoded row address signal that is generated based on the single row address signal, wherein the row decoder area includes a decoded row address driver that is shared by the two banks, wherein the decoded row address driver generates a word line enable signal for a first bank of the two banks in a first time interval, and generates the word line enable signal for a second bank of the two banks in a second time interval subsequent to the first time interval, and wherein a first activation signal for the first bank is deactivated when an activation command for the second bank is generated.

2. The memory device of claim 1, wherein:
the two banks are adjacent to each other.

3. The memory device of claim 1, wherein:
the decoded row address driver generates the word line enable signal based on the single decoded row address signal, the first activation signal provided from the interface area, and a block access signal.

4. The memory device of claim 1, wherein:
a second activation signal for the second bank is activated after the first activation signal for the first bank is deactivated.

5. The memory device of claim 4, wherein:
the first bank performs a precharge operation based on a precharge command that is generated while the second activation signal for the second is activated.

6. The memory device of claim 3, wherein:
the row decoder area further includes a word line driver, and
the word line driver generates a word line driving signal based on the word line enable signal.

7. The memory device of claim 1, wherein:
the two banks include respective column decoder areas that are not shared by the two banks.

8. The memory device of claim 1, wherein the two banks are adjacent to each other and receive the single row address signal through the interface area that is shared by the two banks, and the two banks activate respective word lines based on the single decoded row address signal that is decoded in the interface area from the single row address signal.

9. A memory device comprising:
two banks that share a row decoder area and an interface area that are disposed between the two banks; and
an address register providing a single row address signal to the two banks,
wherein the row decoder area includes a decoded row address driver that is shared by the two banks and that generates a word line enable signal based on a single decoded row address signal generated based on the single row address signal, and
wherein a first memory cell array included in a first bank of the two banks is accessed based on the word line enable signal in a first time interval, and a second memory cell array included in a second bank of the two banks is accessed based on the word line enable signal in a second time interval subsequent to the first time interval,
wherein:
the decoded row address driver generates the word line enable signal based on the single decoded row address signal, an activation signal, and a block access signal, and
a first activation signal for the first bank is deactivated when an activation command for the second bank is generated.

10. The memory device of claim 9, wherein:
a second activation signal for the second bank is activated after the first activation signal for the first bank is deactivated.

11. The memory device of claim 10, wherein:
the first bank performs a precharge operation based on a precharge command that is generated while the second activation signal for the second bank is activated.

12. The memory device of claim 9, wherein:
the row decoder area further includes a word line driver, and
the word line driver generates a word line driving signal based on the word line enable signal.

13. The memory device of claim 9, wherein:
the two banks include respective column decoder areas that are not shared by the two banks.

14. An operation method of a memory device, the operation method comprising:
activating a single decoded row address signal according to a first activation command for a first bank;
generating a first word line enable signal based on the single decoded row address signal, a first block access signal, and a first activation signal;
activating the single decoded row address signal according to a second activation command for a second bank simultaneously performing a per-bank refresh (PBR) operation with the first bank; and
generating a second word line enable signal based on the single decoded row address signal, a second block access signal, and a second activation signal,
wherein the first activation signal is deactivated when the second activation command is generated.

15. The operation method of the memory device of claim 14, wherein:
the second activation signal is activated after the first activation signal is deactivated.

* * * * *